United States Patent
Sadakane et al.

(10) Patent No.: US 12,485,732 B2
(45) Date of Patent: Dec. 2, 2025

(54) VEHICLE WINDOW GLASS AND VEHICLE WINDOW GLASS SYSTEM

(71) Applicant: AGC Inc., Tokyo (JP)

(72) Inventors: Shunsuke Sadakane, Tokyo (JP); Yusuke Nishizawa, Tokyo (JP)

(73) Assignee: AGC INC., Tokyo (JP)

( * ) Notice: Subject to any disclaimer, the term of this patent is extended or adjusted under 35 U.S.C. 154(b) by 481 days.

(21) Appl. No.: 18/111,523

(22) Filed: Feb. 17, 2023

(65) Prior Publication Data

US 2023/0202266 A1 Jun. 29, 2023

Related U.S. Application Data

(63) Continuation of application No. PCT/JP2021/030658, filed on Aug. 20, 2021.

(30) Foreign Application Priority Data

Aug. 25, 2020 (JP) .................. 2020-141676

(51) Int. Cl.
*B32B 15/04* (2006.01)
*B32B 7/12* (2006.01)
*B32B 17/06* (2006.01)
*B32B 17/10* (2006.01)
*B60J 1/00* (2006.01)
(Continued)

(52) U.S. Cl.
CPC ............. *B60J 1/001* (2013.01); *B32B 7/12* (2013.01); *B32B 17/10036* (2013.01); *B32B 17/10788* (2013.01); *B32B 27/08* (2013.01); *B32B 27/30* (2013.01); *B32B 27/306* (2013.01); *B32B 2307/412* (2013.01); *B32B 2307/414* (2013.01)

(58) Field of Classification Search
CPC ................................ B32B 17/10036
USPC ........................................ 428/428
See application file for complete search history.

(56) References Cited

U.S. PATENT DOCUMENTS

| | | | | |
|---|---|---|---|---|
| 5,143,796 A | * | 9/1992 | Sebastiano | .......... C03C 17/3618 |
| | | | | 359/585 |
| 11,639,085 B2 | * | 5/2023 | Pohlen | .................... B60K 35/10 |
| | | | | 428/430 |
| 2017/0001417 A1 | * | 1/2017 | Oota | ................. B32B 17/10761 |

(Continued)

FOREIGN PATENT DOCUMENTS

| | | |
|---|---|---|
| JP | 2017-198981 A | 11/2017 |
| JP | 2019-081698 A | 5/2019 |

(Continued)

OTHER PUBLICATIONS

International Searching Authority, "International Search Report," issued in connection with International Patent Application No. PCT/JP2021/030658, dated Oct. 5, 2021.

(Continued)

*Primary Examiner* — Lauren R Colgan
(74) *Attorney, Agent, or Firm* — Foley & Lardner LLP

(57) ABSTRACT

To improve the visibility of an image displayed on a display from the inside of a vehicle, in a vehicle window glass having the display.
The vehicle window glass has a glass member and a display mounted on said glass member, wherein the visible light transmittance T [%] of said vehicle window glass at the portion including said display and the luminance L [cd/m$^2$] of the display satisfy T≤0.1×L.

20 Claims, 9 Drawing Sheets

(51) Int. Cl.
  *B32B 27/08* (2006.01)
  *B32B 27/30* (2006.01)

(56) References Cited

U.S. PATENT DOCUMENTS

2019/0351654 A1* 11/2019 Nohara ................... B32B 27/30
2019/0351655 A1* 11/2019 Nakajima ......... B32B 17/10761

FOREIGN PATENT DOCUMENTS

| | | |
|---|---|---|
| JP | 2019-172512 A | 10/2019 |
| WO | WO-2015/041106 A1 | 3/2015 |
| WO | WO-2018/181302 A1 | 10/2018 |
| WO | WO-2019/022007 A1 | 1/2019 |
| WO | WO-2019/156030 A1 | 8/2019 |
| WO | WO-2020/226075 A1 | 11/2020 |
| WO | WO-2021/015170 A1 | 1/2021 |
| WO | WO-2021/065616 A1 | 4/2021 |

OTHER PUBLICATIONS

International Searching Authority, "Written Opinion," issued in connection with International Patent Application No. PCT/JP2021/030658, dated Oct. 5, 2021.

* cited by examiner

Luminance L [cd/m²] of the display

Fig. 7

| | | Ex. 1 | Ex. 2 | Ex. 3 | Ex. 4 |
|---|---|---|---|---|---|
| Laminated glass for evaluation | | LG1 | LG2 | LG3 | LG4 |
| Layer construction | Glass plate 11 | Clear G | Green G | Clear G | Privacy G |
| | First interlayer film 131 | Clear PVB | Clear PVB | Colored PVB | Colored PVB |
| | Display 20 | Transparent screen | Transparent screen | Transparent screen | Transparent screen |
| | Second interlayer film 132 | Clear PVB | Clear PVB | Colored PVB | Colored PVB |
| | Glass plate 12 | Clear G | Green G | Clear G | Privacy G |
| Luminance L (cd/m$^2$) of display | | 800 | 800 | 800 | 800 |
| Visible light transmittance T (%) | | 90.0 | 80.0 | 8.0 | 1.6 |
| Judgment | Background luminance 100 (cd/m$^2$) | Unacceptable | Acceptable | Good | Excellent |
| | Background luminance 1000 (cd/m$^2$) | Unacceptable | Unacceptable | Acceptable | Good |
| | Background luminance 5000 (cd/m$^2$) | Unacceptable | Acceptable | Unacceptable | Acceptable |
| | Overall judgment | Unacceptable | Acceptable | Good | Excellent |

Fig. 8

| | | Ex. 5 | Ex. 6 | Ex. 7 | Ex. 8 | Ex. 9 |
|---|---|---|---|---|---|---|
| Laminated glass for evaluation | | LG5 | LG6 | LG7 | LG8 | LG9 |
| Layer construction | Glass plate 11 | Clear G | Green G | Clear G | Privacy G | Privacy G |
| | First interlayer film 131 | Clear PVB | Clear PVB | Colored PVB | Colored PVB | Deeply colored PVB |
| | Display 20 | Organic EL | Organic EL | Organic EL | Organic EL | Organic EL |
| | Second interlayer film 132 | Clear PVB | Clear PVB | Colored PVB | Colored PVB | Deeply colored PVB |
| | Glass plate 12 | Clear G | Green G | Clear G | Privacy G | Privacy G |
| Luminance L (cd/m$^2$) of display | | 400 | 400 | 400 | 400 | 400 |
| Visible light transmittance T (%) | | 45.0 | 40.0 | 4.0 | 0.8 | 0.05 |
| Judgment | Background luminance 100 (cd/m$^2$) | Unacceptable | Acceptable | Good | Excellent | Excellent |
| | Background luminance 1000 (cd/m$^2$) | Unacceptable | Unacceptable | Acceptable | Good | Good |
| | Background luminance 5000 (cd/m$^2$) | Unacceptable | Unacceptable | Unacceptable | Acceptable | Acceptable |
| | Overall judgment | Unacceptable | Acceptable | Good | Excellent | Excellent |

Fig. 9

| | | Ex. 10 | Ex. 11 | Ex. 12 | Ex. 13 | Ex. 14 | Ex. 15 |
|---|---|---|---|---|---|---|---|
| Laminated glass for evaluation | | LG10 | LG11 | LG12 | LG13 | LG14 | LG15 |
| Layer construction | Glass plate 11 | Clear G | Clear G | Clear G | Clear G | Clear G | Clear G |
| | First interlayer film 131 | Clear PVB | Two sheets of Clear PVB | Clear EVA | Two sheets of Clear EVA | Clear PVB | Clear PVB |
| | Display 20 | Organic EL | Organic EL | Organic EL | Organic EL | Organic EL | Organic EL |
| | Second interlayer film 132 | Clear PVB | Two sheets of Clear PVB | Clear EVA | Two sheets of Clear EVA | Colored PVB | Clear PVB |
| | Glass plate 12 | Clear G | Clear G | Clear G | Clear G | Privacy G | Green G |
| Luminance L (cd/m²) of display | | 500 | 500 | 500 | 500 | 500 | 500 |
| Visible light transmittance T (%) | | 45.0 | 45.0 | 44.0 | 44.0 | 6.0 | 40 |
| Visible light diffuse transmittance/ Visible light transmittance (%) | | 0.45 | 0.56 | 0.81 | 1.05 | 2.78 | 0.3 |
| Background luminance irregularities (cd/m²) | | 500 to 1000 | 500 to 1000 | 500 to 1000 | 300 to 1000 | 200 to 1000 | 500 to 1000 |
| Judgment | | Acceptable | Good | Excellent | Excellent | Excellent | Unacceptable |

VEHICLE WINDOW GLASS AND VEHICLE WINDOW GLASS SYSTEM

CROSS-REFERENCE TO RELATED APPLICATIONS

This application is a continuation of PCT Application No. PCT/JP2021/030658, filed on Aug. 20, 2021, which is based upon and claims the benefit of priority from Japanese Patent Application No. 2020-141676 filed on Aug. 25, 2020. The contents of those applications are incorporated herein by reference in their entireties.

TECHNICAL FIELD

The present invention relates to a vehicle window glass and a vehicle window glass system.

BACKGROUND ART

Laminated glass having a transparent screen film or the like sealed in it may sometimes be used as a vehicle window glass. In a reflective transparent screen film, light flux projected from a projection device forms an image on the transparent screen film and is visibly displayed as an image to an observer on the projection device side. With respect to a vehicle window glass having a display of e.g. such a transparent screen film sealed in, studies have been conducted to improve the visibility of the image (see, for example, Patent Document 1), and further improvement is expected.

PRIOR ART DOCUMENT

Patent Document

Patent Document 1: WO 2019/022007

DISCLOSURE OF INVENTION

Technical Problem

The present invention is one which was made in view of the above point, and is intended to improve the visibility of an image displayed on a display from the inside of a vehicle in a vehicle window glass having the display.

Solution to Problem

According to one embodiment of the present invention, there is provided a vehicle window glass having a glass member and a display mounted on said glass member, wherein the visible light transmittance T [%] of said vehicle window glass at the portion including said display and the luminance L [cd/m$^2$] of the display satisfy the formula T≤0.1×L.

Advantageous Effects of Invention

According to one embodiment of the disclosure, it is possible to improve the visibility of an image displayed on a display from the inside of the vehicle, in a vehicle window glass having the display.

BRIEF DESCRIPTION OF DRAWINGS

FIG. 7 is a table (No. 1) illustrating Examples.

FIG. 8 is a table (No. 2) illustrating Examples.

FIG. 9 is a table (No. 3) illustrating Examples.

DESCRIPTION OF EMBODIMENTS

In the following, the embodiments for carrying out the invention will be described with reference to the drawings. In the respective drawings, the same symbols are attached to the same constituent parts, and there may be a case where a duplicate explanation will be omitted for these same constituent parts. Further, in the respective drawings, the size and shape of some parts may be exaggerated to facilitate understanding of the contents of the embodiments of the present invention.

A vehicle to be the object of the present invention is typically an automobile, but shall refer to a moving body having a vehicle window glass, including a train, a ship, an aircraft, etc.

A plan view refers to viewing a predetermined area of a vehicle window glass from the direction normal to the interior side surface of the vehicle window glass, and a planar shape refers to the shape of a predetermined area of a vehicle window glass as viewed from the direction normal to the interior side surface of the vehicle window glass.

First Embodiment

Figure 1:
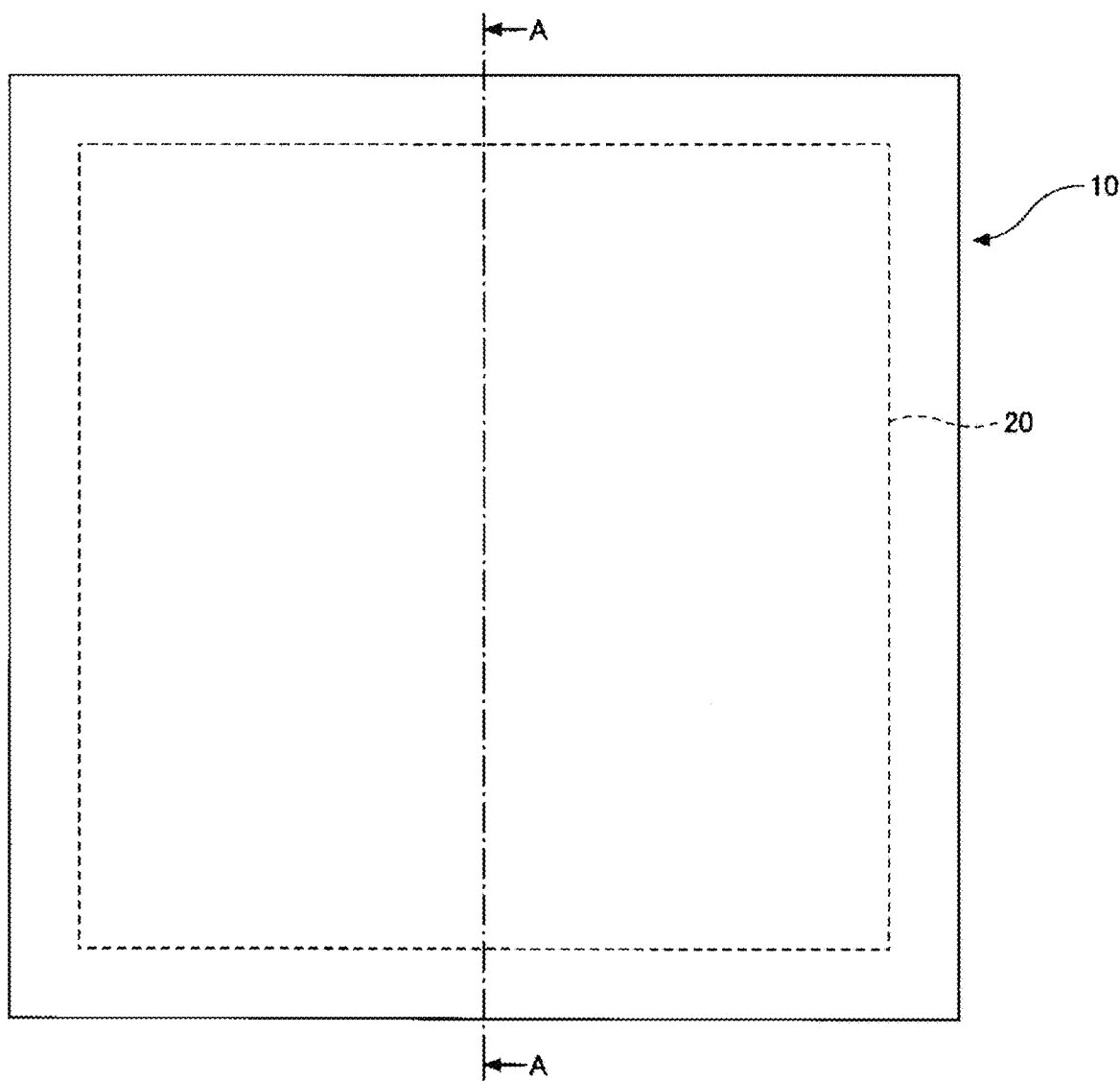
FIG. 1 is a plan view illustrating a vehicle window glass according to the first embodiment of the present invention.
Figure 2:
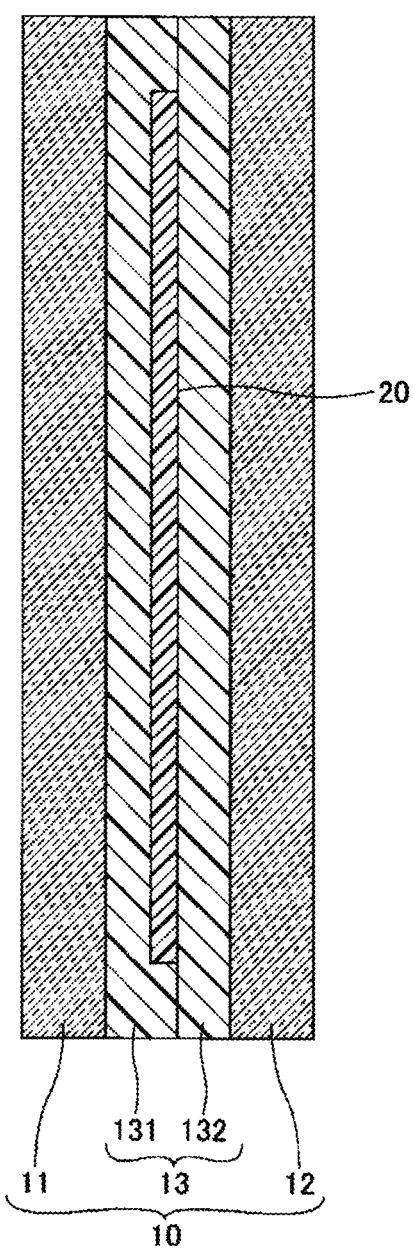
FIG. 2 is a cross-sectional view along the line A-A in FIG. 1.

FIG. 1 is a plan view illustrating a vehicle window glass according to the first embodiment of the present invention, and schematically shows the state where the vehicle window glass is mounted on a vehicle and viewed from inside to outside of the vehicle. FIG. 2 is a cross-sectional view along the line A-A in FIG. 1.

Referring to FIGS. 1 and 2, a vehicle window glass 1 has a glass member 10 and a display 20. The glass member 10 is a laminated glass having a glass plate 11, a glass plate 12, and an interlayer film 13. The glass plate 11 is located on the second side, which becomes the interior side of the vehicle when the vehicle window glass 1 is mounted on the vehicle, and the glass plate 12 is located on the first side, which becomes the exterior side of the vehicle when the vehicle window glass 1 is mounted on the vehicle.

In FIGS. 1 and 2, for convenience of explanation, the vehicle window glass 1 is shown to have a flat shape although actually a curved shape, and the external shape is shown to be a rectangular shape as simplified. However, the vehicle window glass 1 may be a complex curved shape curved in both longitudinal and shortitudinal directions. Otherwise, the vehicle window glass 1 may be a single curved shape curved only in the longitudinal direction or a single curved shape curved only in the shortitudinal direction. Of course, the vehicle window glass 1 may be a flat shape not curved, as shown in FIGS. 1 and 2. In a case where the vehicle window glass 1 is curved, it is preferred that the vehicle window glass 1 is curved so that it is convex toward the outside (first side) of the vehicle. Further, in FIGS. 1 and 2, the vehicle window glass 1 is rectangular, but the planar shape of the vehicle window glass 1 is not limited to a rectangular shape and may be any shape, including a trapezoidal shape.

The vehicle window glass 1 can be applied, for example, to the window glass of an automobile. An automobile has window glass such as windshield, front side glass, rear side glass, rear glass, etc., provided at openings in the vehicle body. An automobile may have other window glass than these, for example, roof glass, front bench glass, rear quarter glass, extra windows, etc. It is possible to realize an automobile having a vehicle window glass 1 mounted on at least one window glass illustrated here. Of course, the vehicle window glass 1 may be applied to the window glass of moving vehicles including trains, ships, aircraft, etc., in addition to the window glass of automobiles. In that case, vehicles having the vehicle window glass 1 mounted thereon can be realized.

The glass plate 11 is the vehicle interior side glass plate that will be on the inside (second side) of the vehicle when the vehicle window glass 1 is mounted on the vehicle. The glass plate 12 is the vehicle exterior side glass plate that will be on the exterior side (first side) of the vehicle when the vehicle window glass 1 is mounted on the vehicle.

In a case where the vehicle window glass 1 is curved, the minimum value of the radius of curvature is preferably at least 500 mm and at most 100,000 mm. The radii of curvature of the glass plate 11 and the glass plate 12 may be the same or different. In a case where the radii of curvature of the glass plate 11 and the glass plate 12 are different, the radius of curvature of the glass plate 11 is smaller than that of the glass plate 12.

The glass plate 11 and the glass plate 12 are a pair of glass plates facing each other, and the interlayer film 13 and the display 20 are located between the pair of glass plates. The glass plate 11 and the glass plate 12 are adhered to each other in such a state that they sandwich the interlayer film 13 and the display 20.

The interlayer film 13 is a film that bonds the glass plate 11 and the glass plate 12. The interlayer film 13 has, for example, a first interlayer film 131 bonding to the glass plate 11 and a second interlayer film 132 bonding to the glass plate 12. Separately from the first interlayer film 131 and the second interlayer film 132, it may have a frame-like interlayer film that surrounds the periphery of the display 20, as located between the first interlayer film 131 and the second interlayer film 132. When there is no need to distinguish the first interlayer film 131 and the second interlayer film 132, they are simply referred to as the interlayer film 13.

It is preferred that the periphery of the interlayer film 13 is edge treated. That is, it is preferred that the edge (edge) of the interlayer film 13 is treated so that it does not protrude significantly from the edge (edge) of the glass plates 11 and 12. If the amount of protrusion of the edge of the interlayer film 13 from the edge of the glass plates 11 and 12 is at most 150 μm, such is suitable in that it does not spoil the appearance. However, in a case where the vehicle window glass 1 is a side glass, edge treatment of the lower edge of the interlayer film 13 is not necessary because the lower edge is concealed by the door panel. Details of the glass plate 11, the glass plate 12 and the interlayer film 13 will be described later.

Further, a shielding layer may be provided, for example, in a strip shape along the periphery area of the vehicle window glass 1. The shielding layer is an opaque layer and is provided, for example, in a strip shape along the periphery of the vehicle window glass 1. The shielding layer is, for example, an opaque colored ceramic layer. The color is optional, but a dark color such as black, brown, gray, dark blue or the like is preferred, and black is more preferred. The shielding layer may be a colored interlayer film or colored film having light shielding properties, a combination of a colored interlayer film and a colored ceramic layer, or a layer having a light controlling function. The colored film may be integrated with an infrared reflective film or the like.

The width of the shielding layer in plan view is, for example, at a level of from 10 mm to 200 mm. By the presence of the opaque shielding layer in the vehicle window glass 1, it is possible to prevent an adhesive made of a resin such as urethane that holds the periphery of the vehicle window glass 1 to the vehicle body from deteriorating due to ultraviolet rays. Further, in a case where the display 20 has busbars or electrodes, the busbars or electrodes electrically connected to the display 20 can be concealed so that they are not easily visible from the outside and/or inside of the vehicle.

The shielding layer can be formed, for example, by applying a ceramic color paste containing fusible glass frit containing black pigment onto a glass plate by screen printing, etc., followed by baking, but is not limited thereto. The shielding layer may be formed, for example, by applying an organic ink containing black or dark pigment onto a glass plate by screen printing, etc., followed by drying.

The display 20 is mounted on the glass member 10. In this application, "mounted on the glass member" shall include at least the case where the display is sealed in an interlayer film as shown in FIG. 2, and the case where the display is bonded to a predetermined surface of the glass member as in FIGS. 4 to 6 described later. In this embodiment, the display 20 is sealed in the interlayer film 13 of the glass member 10.

The display 20 is a film-like component that displays information such as images and letters. The information here is not limited, but may, for example, be guidance about the scenery outside the vehicle, danger notices, road traffic information, route guidance, advertising, and entertainment (e.g. movies, etc.).

The type of the display 20 is not limited, but may, for example, be liquid crystal displays, organic electro-luminescence (OLED) displays, inorganic electro-luminescence (Inorganic EL) displays, light-emitting diode (LED) displays, etc. LED displays include displays having small LEDs called mini-LEDs or micro-LEDs mounted thereon. The display 20 has, for example, a glass or plastic substrate and a display element (a liquid crystal display element, an organic EL display element, an inorganic EL display element, a LED element, or the like).

In a case where the display 20 is a display having a display element, the display 20 may have a component other than the substrate and the display element (such as a protective layer covering the display element), as the case requires. Each component of the display 20 may be formed from a transparent material to let outside of the vehicle visible. Further, the display 20 may be reflective type. When the vehicle window glass 1 of this embodiment is mounted on the vehicle, the direction in which the display 20 displays information such as images and letters is toward the inside of the vehicle.

However, the display 20 is not limited to a display having a display element as described above, but may, for example, be a transparent screen film that displays light flux projected from a projection device as an image visible to an observer. The display having a transparent screen film may be a reflective type, where the projection device and the observer (e.g. an occupant in the vehicle cabin) are on the same side with respect to the transparent screen film. Further, the transparent screen film may be a light-controlling film which is capable of controlling at least one of visible light transmittance and haze. The light-controlling film, for example, has a haze of at least 30%, preferably at least 50%, more preferably at least 80%, at the time of shielding light. The haze can be determined in accordance with ISO 14782: 1999.

The display 20 may be placed on the entire vehicle window glass 1 or only a part of it, as the case requires. In a case where the vehicle window glass 1 is applied to the windshield, the display 20 is placed at a position where it does not interfere with the driver's driving. The planar shape of the display 20 is, for example, a rectangle smaller than the planar shape of the vehicle window glass 1. The thickness of the display 20 is, for example, at least 0.1 mm and at most 3 mm.

Here, the glass plate 11, glass plate 12 and interlayer film 13 will be described in detail.

[Glass Plates]

Glass plates 11 and 12 may be inorganic or organic glass. As inorganic glass, for example, soda-lime glass, aluminosilicate glass, borosilicate glass, alkali-free glass, quartz glass, or the like, may be used without any particular restriction. As the glass plate 12 located on the outside of the vehicle window glass 1, inorganic glass is preferred from the standpoint of scratch resistance, and soda-lime glass is preferred from the standpoint of formability. In a case where glass plate 11 and glass plate 12 are soda-lime glass, clear glass, green glass containing at least a predetermined amount of iron component, and UV-cut green glass can be suitably used. There may be a case where privacy glass as described later, is used as glass plates 11 and 12.

Inorganic glass may be either untoughened or tempered glass. Untoughened glass is one made by forming molten glass into a plate and annealing it slowly. Tempered glass is one having a compressive stress layer on the surface of untoughened glass.

Tempered glass may be either physically tempered glass such as air-cooled tempered glass, or chemically tempered glass. In the case of physically tempered glass, the glass surface can be strengthened by creating a compressive stress layer on the glass surface due to a temperature difference between the glass surface and the glass interior by an operation other than slow cooling, for example, by rapidly cooling a uniformly heated glass plate from a temperature near its softening point in bending forming.

In the case of chemically tempered glass, for example, the glass surface can be strengthened by creating a compressive stress on the glass surface by e.g. an ion exchange method after bending forming. Otherwise, glass that absorbs ultraviolet or infrared rays may be used. Further, although transparency is preferred, glass plates that are colored to such an extent that transparency is not impaired may also be used.

On the other hand, materials for organic glass include polycarbonates, acrylic resins such as polymethyl methacrylate, and transparent resins such as polyvinyl chloride and polystyrene.

The shape of the glass plates 11 and 12 is not particularly limited to a rectangular shape, and may be formed into various shapes and curvatures. For bending and forming of glass plates 11 and 12, gravity forming, press forming, roller forming, or the like may be used. The forming method of glass plates 11 and 12 is also not particularly limited, but, for example, in the case of inorganic glass, glass plates formed by the float method or the like are preferred.

The thickness of the glass plate 12 is preferably at least 1.1 mm and at most 3 mm at the thinnest part. When the thickness of the glass plate 12 is at least 1.1 mm, the glass plate 12 is strong enough to resist flying stones, etc. When the thickness is at most 3 mm, the mass of the vehicle window glass 1 will not be too large, such being desirable in terms of vehicle fuel consumption. The thickness of the glass plate 12 is more preferably at least 1.8 mm and at most 2.8 mm, further preferably at least 1.8 mm and at most 2.6 mm, even more preferably at least 1.8 mm and 2.2 mm, further more preferably at least 1.8 mm and at most 2.0 mm, at the thinnest part.

The thickness of the glass plate 11 is preferably at least 0.3 mm and at most 2.3 mm. When the thickness of the glass plate 11 is at least 0.3 mm, handling efficiency is good, and when the thickness is at most 2.3 mm, the mass will not be too large.

Further, the glass plates 11 and 12 may be flat or curved. However, if the glass plates 11 and 12 are curved and the thickness of the glass pate 11 is not proper, if two pieces of glass with particularly deep bends are formed as the glass plates 11 and 12, a mismatch in the shape of the two pieces will occur, which will significantly affect the quality of the glass, such as residual stress after pressure bonding.

However, by making the thickness of the glass plate 11 to be at least 0.3 mm and at most 2.3 mm, it is possible to maintain the quality of the glass such as residual stress. Setting the thickness of the glass plate 11 to be at least 0.3 mm and at most 2.3 mm, is particularly effective in maintaining the glass quality in deeply bent glass. The thickness of the glass plate 11 is more preferably at least 0.5 mm and at most 2.1 mm, further preferably at least 0.7 mm and at most 1.9 mm. In this range, the above effects will be even more pronounced.

In a case where the vehicle window glass 1 is used, for example, for a head-up display, the glass plates 11 and/or 12 are not of a constant thickness, and as the case requires, the thickness may vary from location to location. For example, in a case where the vehicle window glass 1 is a windshield, either one or both of the glass plates 11 and 12 may be wedge-shaped in cross section, with the thickness of the plate increasing from the lower edge to the upper edge of the windshield. In this case, if the thickness of the interlayer film 13 is constant, the total wedge angle of the glass plate 11 and the glass plate 12 may be varied within a range of, for example, more than 0 mrad and at most 1.0 mrad.

On the outside of the glass plates 11 and/or 12, a coating having water repellency, ultraviolet and infrared rays cutting functions, or a coating having low reflective and low emissive characteristics, may be provided. Also, on the side of the glass plates 11 and/or 12 in contact with the interlayer film 13, a coating having ultraviolet or infrared rays cutting, low-emissive properties, visible light absorption, coloring, etc., may be provided.

In a case where the glass plates 11 and 12 are curved-shaped inorganic glass, the glass plates 11 and 12 are bent and formed after forming by the float method and before bonding with the interlayer film 13. Bending and forming is performed by heating the glass to soften it. The heating temperature of the glass during bending and forming should be controlled in a range of approximately from 550° C. to 700° C.

[Interlayer Film]

As the interlayer film 13, a thermoplastic resin is often used, and, for example, thermoplastic resins conventionally used for this type of applications, such as plasticized polyvinyl acetal resins, plasticized polyvinyl chloride resins, saturated polyester resins, plasticized saturated polyester resins, polyurethane resins, plasticized polyurethane resins, ethylene-vinyl acetate copolymer resins, ethylene-ethyl acrylate copolymer resins, cycloolefin polymer resins, ionomer resins, etc. may be mentioned. Further, resin compositions containing modified block copolymer hydrides as described in Japanese Patent No. 6065221 may also be suitably used.

Among these, plasticized polyvinyl acetal resins are suitably used because of their excellent balance of various performances such as transparency, weather resistance, strength, adhesive strength, penetration resistance, impact energy absorption, moisture resistance, thermal barrier properties and sound insulation properties. These thermoplastic resins may be used alone or in combination. The term "plasticized" in the above plasticized polyvinyl acetal resins means being plasticized by the addition of a plasticizer. The same applies to other plasticized resins.

However, when encapsulating a certain material in the interlayer film 13, depending on the type of the material to be encapsulated, it may be degraded by a certain plasticizer, and in such a case, it is preferred to use a resin that substantially does not contain such a plasticizer. In other words, there may be a case where it is desirable that the interlayer film 13 does not contain a plasticizer. As a resin that does not contain a plasticizer, for example, an ethylene-vinyl acetate copolymer resin (hereinafter referred to also as "EVA" as the case requires) or the like may be mentioned.

The above polyvinyl acetal resins include a polyvinyl formal resin obtained by reacting a polyvinyl alcohol (hereinafter referred to also as "PVA" as the case requires) with formaldehyde, a polyvinyl acetal resin in the narrow sense obtained by reacting PVA with acetaldehyde, a polyvinyl butyral resin (hereinafter referred to as "PVB" as the case requires) obtained by reacting PVA with n-butyraldehyde, etc., and in particular, PVB may be mentioned as a suitable one, since it is excellent in balance of various properties such as transparency, weather resistance, strength, adhesive strength, penetration resistance, impact energy absorption, moisture resistance, thermal barrier properties and sound insulation properties. These polyvinyl acetal resins may be used alone or in combination.

However, the material used to form the interlayer film 13 is not limited to a thermoplastic resin. Further, the interlayer film 13 may contain functional particles such as infrared absorbers, ultraviolet absorbers, or luminescent agents. Further, the interlayer film 13 may have a colored portion called a shade band. The colored pigment to be used to form the colored portion may be one that can be used for a plastic and that makes the visible light transmittance of the colored portion to be at most 40%, and is not particularly limited, but, for example, may be an organic color pigment such as azo type, phthalocyanine type, quinacridone type, perylene type, perinone type, dioxazine type, anthraquinone type, or isoindolino type, or an inorganic color pigment such as an oxide, a hydroxide, a sulfide, a chromate, a sulfate, a carbonate, a silicate, a phosphate, an arsenate, a ferrocyanide, carbon, metal powder, etc. These colored pigments may be used alone or in combination of two or more types. The amount of the colored pigment to be added is arbitrary to meet the desired color tone and not particularly limited, as long as it is one whereby the visible light transmittance of the colored portion will be at most 40%.

The thickness of the interlayer film 13 is preferably at least 0.5 mm at the thinnest part. In a case where the interlayer film 13 consists of the first interlayer film 131 and the second interlayer film 132, the thickness of the interlayer film 13 is the sum of the thickness of the first interlayer film 131 and the thickness of the second interlayer film 132. When the thickness of the thinnest part of the interlayer film 13 is at least 0.5 mm, the impact resistance required for a vehicle window glass will be sufficient. The thickness of the interlayer film 13 is preferably at most 3 mm at the thickest part. When the maximum value of the thickness of the interlayer film 13 is at most 3 mm, the mass of the vehicle window glass will not become too large. The maximum value of the thickness of the interlayer film 13 is more preferably at most 2.8 mm, further preferably at most 2.6 mm.

In a case where the vehicle window glass 1 is to be used, for example, for a head-up display, the interlayer film 13 may not have a constant thickness, but the thickness may vary from place to place as the case requires. For example, in a case where the vehicle window glass 1 is a windshield, the interlayer film 13 may be wedge-shaped in cross-section, so that the film thickness increases from the lower edge to the upper edge of the windshield in such a state that the windshield is mounted on the vehicle. In this case, if the thicknesses of the glass plates 11 and 12 are constant, the wedge angle of the interlayer film 13 may be varied within such a range of, for example, larger than 0 mrad and at most 1.0 mrad.

Further, the interlayer film 13 may have three or more layers. For example, if the interlayer film is formed from three or more layers and the shear modulus of any of the layers other than the layers on both sides is made to be smaller than the shear modulus of the layers on both sides by e.g. adjusting the plasticizer or the like, the sound insulation properties of the vehicle window glass 1 can be improved. In this case, the shear modulus of layers on both sides may be the same or different.

Further, the first interlayer film 131 and the second interlayer film 132 contained in the interlayer film 13 are preferably made of the same material, but the first interlayer film 131 and second interlayer film 132 may be formed of different materials. However, from the viewpoint of adhesion to the glass plates 11 and 12 or the functional material to be included in the vehicle window glass 1, it is preferred to use the above material for at least 50% of the thickness of the interlayer film 13.

To make the interlayer film 13, for example, the above resin material to be the interlayer film is appropriately selected and extrusion molded in a heated molten state by using an extruder. Extrusion conditions such as extrusion speed, etc. of the extruder should be set to be uniform. Then, the extrusion molded resin film is stretched, for example, as the case requires, to provide curvature to the upper and lower edges in accordance with the design of the vehicle window glass, thereby completing the interlayer film 13.

[Vehicle Window Glass]

The total thickness of the vehicle window glass 1 is preferably at least 2.8 mm and at most 10 mm. When the total thickness of the vehicle window glass 1 is at least 2.8 mm, sufficient rigidity can be secured. Further, when the total thickness of the vehicle window glass 1 is at most 10 mm, a sufficient transmittance can be obtained and the haze can be reduced.

On at least one side of the vehicle window glass 1, the plate misalignment between the glass plate 11 and the glass plate 12 is preferably at most 1.5 mm, more preferably at most 1 mm. Here, the plate misalignment between the glass plate 11 and the glass plate 12 refers to the amount of misalignment between the edge of the glass plate 11 and the edge of the glass plate 12 in plan view.

When the plate misalignment between the glass plate 11 and the glass plate 12 is at most 1.5 mm on at least one side of the vehicle window glass 1, such is suitable in that it does not spoil the outer appearance. When the plate misalignment between the glass plate 11 and the glass plate 12 is at most 1.0 mm on at least one side of the vehicle window glass 1, such is more suitable because it does not spoil the outer appearance.

To produce the vehicle window glass 1, the first interlayer film 131, the display 20 and the second interlayer film 132 are sandwiched between the glass plate 11 and the glass plate 12 to make a laminate. And, the laminate is then placed in, for example, a rubber bag, a rubber chamber, or a resin bag, and bonded in a vacuum having the gauge pressure controlled in a range of from −65 kPa to −100 kPa by controlling the temperature in a range of from about 70° C. to 110° C. Heating conditions, temperature conditions, and the lamination method may suitably be selected.

Further, for example, by carrying out the heat and pressure bonding treatment under controlled conditions in a temperature range of from 100° C. to 150° C. and an absolute pressure range of from 0.6 MPa to 1.3 MPa, it is possible to obtain a vehicle window glass 1 with better durability. However, in some cases, this heating and pressurizing process may not be used in consideration of simplifying the process and taking account of the characteristics of the materials to be sealed in the vehicle window glass 1.

In other words, a method called "cold bending" may be used, in which the glass plate 11 and the glass plate 12 are bonded in such a state that either one or both of them are elastically deformed. The cold bending can be carried out by using a laminate consisting of the glass plate 11, the first interlayer film 131, the display 20, the second interlayer film 132 and the glass plate 12 fixed by a provisional fixing means such as a tape, a conventionally known pre-bonding device such as a nip roller or a rubber bag, rubber chamber, etc. and an autoclave.

Between the glass plate 11 and the glass plate 12, to such an extent that the effect of the present invention is not impaired, in addition to the interlayer film 13 and the display 20, there may be a film or device having functions such as electric heating wire, infrared reflection, light emission, power generation, light controlling, touch panel, visible light reflection, scattering, decoration, absorption and so on. The light controlling film is a component that includes a light controlling element capable of adjusting visible light transmittance, etc. For example, the light controlling film may be a suspended particle device (SPD), a polymer dispersion liquid crystal (PDLC) film, a guest-host liquid crystal (GHLC) films, an electrochromic device, a photochromic device, or a thermochromic device. Further, on the surface of the glass member 10, there may be a coating having functions such as antifogging, water repellency, heat shielding, low reflection, etc. Further, on the exterior side of the glass plate 11 or the interior side of the glass plate 12, there may be a coating having functions such as heat shielding, heat generation, etc. Such films, devices or coatings are the first or second components that are located on the vehicle exterior or interior side than the display 20. When having them, the vehicle window glass 1 preferably also satisfies various parameters such as visible light transmittance, visible light diffuse transmittance/visible light transmittance, visible light reflectance, and visible light diffuse reflectance, which will be described later. In the case of including a light controlling film, the numerical value range to be satisfied should be available regardless of the specific light controlling state (applied voltage).

[Visibility of Display]

Next, the visibility of images displayed on the display 20 from inside the vehicle will be described.

Figure 3:
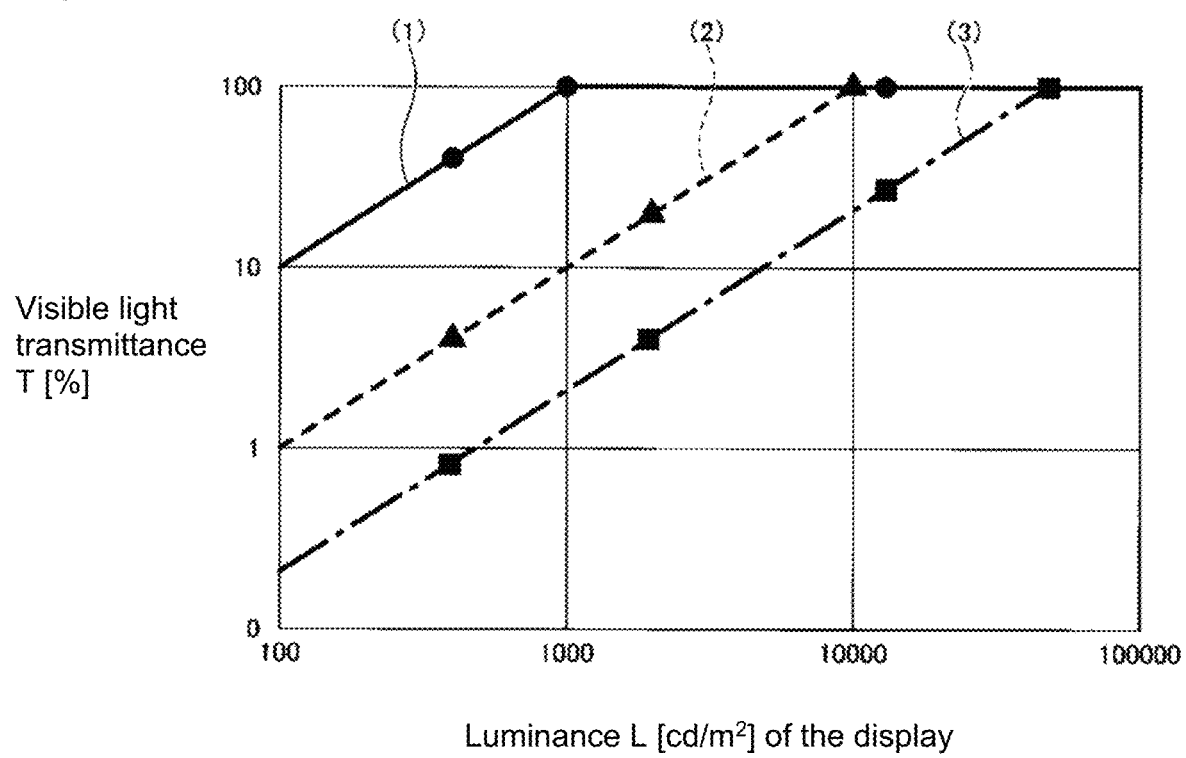
FIG. 3 is a view showing the relationship between the visible light transmittance of the portion including the display and the luminance of the display in the vehicle window glass of the first embodiment.

FIG. 3 is a view showing the relationship between the visible light transmittance T [%] at the portion including the display in the vehicle window glass 1 and the luminance L [cd/m$^2$] of the display. In FIG. 3, (1) is a straight line of T=0.1×L, (2) is a straight line of T=0.01×L, and (3) is a straight line of T=0.002×L. The visible light transmittance T shown in FIG. 3 can be measured by the method in accordance with JIS R 3106: 1998.

Here, the luminance is the light flux [cd/m$^2$] emitted from the surface of the display 20 per unit solid angle per unit area (see SAEJ1757-2). The luminance L of the display 20 is the maximum luminance of the image (measuring wavelength of from 380 nm to 780 nm) that can be displayed on the display 20, as measured in a dark room of at most 0.1 cd/m$^2$ at a temperature of 20° C. with a humidity of 60%, in the direction of the normal line inside of the vehicle passing through the center of gravity of the display area of the display 20, at a location at a distance of 50 cm from the center of gravity of the display area of the display 20.

The relationship in FIG. 3 is one derived by the present inventors through repeated experiments. This is explained below.

To make the light flux from the display 20 visible as an image from inside of the vehicle and further improve the visibility, it is preferred to increase the luminance of the image or decrease the luminance of the background, or to conduct both. As a result of repeated experiments, the present inventors have found that to make the light flux from the display 20 visible as the image from inside of the vehicle, the relationship between the visible light transmittance T at the portion including the display 20 and the luminance L of the display 20 is within the range below the line (1) in FIG. 3.

In other words, to make the light flux from the display 20 visible as the image from inside of the vehicle, the relationship between the visible light transmittance T of the vehicle window glass 1 at the portion including the display 20 and the luminance L of the display is required to be T≤0.1×L. Here, in this specification, visible light refers to light with a wavelength of from 380 nm to 780 nm.

To further improve the visibility, T≤0.01×L (the range below the line (2) in FIG. 3) is preferred, and T≤0.002×L (the range below the line (3) in FIG. 3) is more preferred. In particular, when T≤0.002×L is satisfied, it is effective in reducing glare and secondary images as well as improving the visibility. Glare is a phenomenon in which light from outside of the vehicle is scattered when it enters the vehicle through the vehicle window glass 1, and can be suppressed more as the visible light transmittance T is lower. The secondary image is an image that is visible separately from the image when light flux from the display 20 is reflected at the interface of the first component of the vehicle window glass 1 (e.g. the exterior surface), and can be suppressed more as the visible light transmittance T is lower.

On the other hand, from the viewpoint of making the outside of the vehicle visible, the visible light transmittance T at the portion of the vehicle window glass 1 that includes the display 20 is preferably at least 0.1%, more preferably at least 0.5%, further preferably at least 1%. The luminance L is preferably from 1 cd/m$^2$ to 30,000 cd/m$^2$, and is preferably controlled depending upon the brightness of outside of the vehicle. The luminance L is preferably at least 100 cd/m$^2$, more preferably at least 200 cd/m$^2$, further preferably at least 400 cd/m$^2$. When the luminance L is at least 100 cd/m$^2$, the visibility will be excellent. The luminance L is preferably at most 10,000 cd/m$^2$, more preferably at most 5,000 cd/m$^2$, further preferably at most 1,000 cd/m$^2$. When the luminance L is at most 10,000 cd/m$^2$, local heating is less likely to occur, and the occurrence of perspective distortion and thermal cracking can be suppressed. In addition, when projecting onto a transparent screen, the heat generated by the projector will not be too large.

To reduce the visible light transmittance T at the portion including the display, the visible light transmittance of the glass plate 11 may be reduced, the visible light transmittance of the glass plate 12 may be reduced, the visible light transmittance of the first interlayer film 131 may be reduced, the visible light transmittance of the second interlayer film 132 may be reduced, or two or more of these may be combined.

To reduce the visible light transmittance of the glass plate 11 and/or the glass plate 12, for example, the glass plate 11 and/or the glass plate 12 may be made to be privacy glass. To reduce the visible light transmittance of the first interlayer film 131 and/or the second interlayer film 132, for example, the first interlayer film 131 and/or the second interlayer film 132 may be made of colored interlayer film. Or, it is possible to reduce the visible light transmittance, by making the thickness of the first interlayer film 131 and/or the second interlayer film 132 to be thick (by increasing the number of layers of the first interlayer film 131 and/or the second interlayer film 132), or selecting the material.

Among these, from the viewpoint of darkening the outside light and reducing the background luminance, it is preferred to reduce the visible light transmittance of the first component (glass plate 12 and second interlayer film 132) located on the vehicle exterior side of the display 20. Here, the "first component located on the vehicle exterior side of the display 20" refers to an assembly of various components located on the vehicle exterior side of the display 20, and it is not limited to an assembly of composite elements when multiple components are located on the exterior side of the vehicle, but also includes a single element when only a single component is located on the exterior side of the vehicle. Specifically, the visible light transmittance of the assembly of the components, e.g. the assembly comprising the glass plate 12 and the second interlayer film 132, is preferably at most 50%, more preferably at most 30%, further preferably at most 20%.

For example, by using privacy glass as the glass plate 12 and using a clear interlayer film as the second interlayer film 132, the visible light transmittance of the first component (assembly) of the glass plate 12 and the second interlayer film 132, can be made to be at most 50%. Further, by using clear glass or green glass as the glass plate 12 and using a colored interlayer film as the second interlayer film 132, the visible light transmittance of the first component (assembly) of the glass plate 12 and the second interlayer film 132, can be made to be at most 30%. Further, by using privacy glass as the glass plate 12 and using a colored interlayer film as the second interlayer film 132, the visible light transmittance of the first component (assembly) of the glass plate 12 and the second interlayer film 132, can be made to be at most 20%. Alternatively, by placing the display 20 at a position overlapping with a shielding layer such as a colored ceramic layer, the visible light transmittance of the first component (assembly) of the glass plate 12 and the second interlayer film 132 can be made to be at most 50%.

On the other hand, from the viewpoint of keeping the display 20 brighter, it is preferred to increase the visible light transmittance of the second component (the glass plate 11 and the first interlayer film 131) located on the vehicle interior side of the display 20. Here, the "second component located on the vehicle interior side of the display 20" refers to an assembly of various components located on the vehicle interior side of the display 20, and it is not limited to an assembly of composite elements in which multiple components are located on the interior side of the vehicle, but also includes the case of a single element in which only a single component is located on the interior side of the vehicle. Specifically, the visible light transmittance of the assembly of the second component, e.g. the second component (assembly) of the glass plate 11 and the first interlayer film 131, is preferably at least 15%, more preferably at least 40%.

For example, by using clear glass or green glass as the glass plate 11 and using a colored interlayer film as the first interlayer film 131, the visible light transmittance of the second component (assembly) of the glass plate 11 and the first interlayer film 131, can be made to be at least 15%. Further, by using privacy glass as the glass plate 11 and using a clear interlayer film as the first interlayer film 131, the visible light transmittance of the second component (assembly) of the glass plate 11 and the first interlayer film 131, can be made to be at least 40%.

Further, from the viewpoint of making the display 20 inconspicuous from inside of the vehicle when the display 20 is off, it is preferred to reduce the visible light transmittance of the second component (the glass plate 11 and the first interlayer film 131). The visible light transmittance of the second component (assembly) of the glass plate 11 and the first interlayer film 131 is preferably at most 90%, more preferably at most 50%.

For example, by using green glass as the glass plate 11 and using a clear interlayer film as the first interlayer film 131, the visible light transmittance of the second component (assembly) of the glass plate 11 and the first interlayer film 131, can be made to be at most 90%. Further, by using privacy glass as the glass plate 11 and using a clear interlayer film as the first interlayer film 131, the visible light transmittance of the second component (assembly) of the glass plate 11 and the first interlayer film 131, can be made to be at most 50%.

From the viewpoint of reducing the background luminance and maintaining the luminance of the display 20, the visible light transmittance of the second component (glass plate 11 and first interlayer film 131) is preferably larger than the visible light transmittance of the first component (glass plate 12 and second interlayer film 132).

Further, although unevenness in background luminance increases along with changes in the external environment when the vehicle is in motion, the higher the visible light diffuse transmittance/visible light transmittance of the first component (glass plate 12 and second interlayer film 132), the more frosted the vehicle window glass 1 becomes (the higher the haze value), whereby it is possible to mitigate the background luminance irregularities that occur during driving and to obtain good visibility of the display 20. Here, the visible light diffuse transmittance/visible light transmittance is the value obtained by dividing the visible light diffuse transmittance by the visible light transmittance (i.e. the ratio of visible light diffuse transmittance to visible light transmittance). Here, the visible light diffuse transmittance is led by the same calculation method for the visible light transmittance, by measuring the diffuse transmittance excluding transmissions other than perpendicular transmissions, in the measuring method for the visible light transmittance as disclosed in JIS R3106: 1998.

From the viewpoint of mitigating background luminance irregularities that occur when driving, the visible light diffuse transmittance/visible light transmittance of the first component (glass plate 12 and second interlayer film 132) is preferably at least 0.4%, more preferably at least 0.8%, further preferably at least 1.0%, particularly preferably at least 2.5%.

For example, by using clear glass as the glass plate 12 and using a clear interlayer film made of PVB as the second interlayer film 132, the visible light diffuse transmittance/visible light transmittance of the first component (assembly) of the glass plate 12 and the second interlayer film 132 can be made to be at least 0.4%. Further, by using clear glass as the glass plate 12 and using a clear interlayer film made of EVA as the second interlayer film 132, the visible light diffuse transmittance/visible light transmittance of the first component (assembly) of the glass plate 12 and the second interlayer film 132 can be made to be at least 0.8%. Further, by using clear glass as the glass plate 12 and making the thickness of the clear interlayer film that serves as the second interlayer film 132 to be larger (e.g. if the second interlayer film 132 is made of two clear interlayer films made of EVA), the visible light diffuse transmittance/visible light transmittance of the first component (assembly) of the glass plate 12 and the second interlayer film 132, can be made to be at least 1.0%. The clear interlayer film made of EVA has more crystalline portions and is more diffusive than the clear interlayer film made of PVB, whereby it is advantageous in that the visible light diffuse transmittance/visible light transmittance value can be increased. Otherwise, the diffusivity in EVA can also be increased by reducing the vinyl acetate content and increasing the crystalline portion.

Further, by using privacy glass as the glass plate 12 and using a colored interlayer film as the second interlayer film 132, the visible light diffuse transmittance/visible light transmittance of the first component (assembly) of the glass plate 12 and the second interlayer film 132, can be made to be at least 2.5%. Also, by using clear glass or green glass as the glass plate 12 and using a colored interlayer film as the second interlayer film 132, the visible light diffuse transmittance/visible light transmittance of the first component (assembly) of the glass plate 12 and the second interlayer film 132 can be made to be at least 2.5%.

From the viewpoint of improving the visibility of the outside scenery, a visible light diffuse transmittance/visible light transmittance is preferably at most 5%, more preferably at most 4.5%, further preferably at most 4%, particularly preferably at most 3.5%.

Further, from the viewpoint of ensuring the visibility of the display 20 while suppressing background luminance irregularities, the visible light diffuse transmittance/visible light transmittance of the second component (glass plate 11 and first interlayer film 131) is preferably smaller than the visible light diffuse transmittance/visible light transmittance of the first component (glass plate 12 and second interlayer film 132).

Further, from the viewpoint of improving the visibility of the image on the display 20 and the outside view by reducing the reflection of objects inside the vehicle, it is preferred to reduce the visible light reflectance of the first component (glass plate 12 and second interlayer film 132). Specifically, the visible light reflectance of the first component (assembly) of the glass plate 12 and the second interlayer film 132 is preferably at most 6%, more preferably at most 5%. Here, the visible light reflectance can be measured by the method in accordance with JIS R 3106: 1998.

For example, by using privacy glass as the glass plate 12 and using a clear interlayer film as the second interlayer layer 132, the visible light reflectance of the first component (assembly) of the glass plate 12 and the second interlayer film 132 can be made to be at most 6%. Further, by using clear glass or green glass as the glass plate 12 and using a colored interlayer film as the second interlayer film 132, the visible light reflectance of the first component (assembly) of the glass plate 12 and the second interlayer film 132 can be made to be at most 5%. Further, also by using privacy glass as the glass plate 12 and using a colored interlayer film as the second interlayer film 132, the visible light reflectance of the first component (assembly) of the glass plate 12 and the second interlayer film 132 can be made to be at most 5%. According to these configurations, light incident from the interior side of the vehicle can be absorbed by the first component, thereby reducing the reflection at the main surface of the glass plate 12 on the exterior side of the vehicle and lowering the visible light reflectance.

Further, from the viewpoint of improving the visibility of the image on the display 20 and the outside view, it is preferred to reduce the visible light diffuse reflectance of the first component (glass plate 12 and second interlayer film 132). Specifically, the visible light diffuse reflectance of the first component (assembly) of the glass plate 12 and the second interlayer film 132 is preferably at most 6%, more preferably at most 5%. Here, the visible light diffuse reflectance of the first component (glass plate 12 and second interlayer film 132) is led by the same calculation method as for the visible light reflectance, by measuring diffuse reflected light including reflections other than positive reflections as received by an integrating sphere, in the method for measuring spectral reflectance described in JIS R3106: 1998.

For example, by using privacy glass as the glass plate 12 and using a clear interlayer film as the second interlayer film 132, the visible light diffuse reflectance of the first component (assembly) of the glass plate 12 and the second interlayer film 132, can be made to be at most 6%. Further, by using clear glass or green glass as the glass plate 12 and using a colored interlayer film as the second interlayer film 132, the visible light diffuse reflectance of the first component (assembly) of the glass plate 12 and the second interlayer film 132, can be made to be at most 5%. Further, also by using privacy glass as the glass plate 12 and using a colored interlayer film as the second interlayer film 132, the visible light diffuse reflectance of the first component (assembly) of the glass plate 12 and the second interlayer film 132 can be made to be at most 5%. According to these configurations, light incident from the interior side of the vehicle can be absorbed by the first component, thereby reducing the reflection at the main surface of the glass plate 12 on the exterior side of the vehicle and lowering the visible light diffuse reflectance.

Further, from the viewpoint of improving the visibility of the image on the display 20 by reducing the diffusion of light emitted from the display 20, it is preferred to reduce the visible light diffuse reflectance of the second component (glass plate 11 and first interlayer film 131). Specifically, the visible light diffuse reflectance of the second component (assembly) of the glass plate 11 and the first interlayer film 131, is preferably at most 6%, more preferably at most 5%.

Here, the visible light diffuse reflectance of the second component (glass plate 11 and first interlayer film 131) is led by the same calculation method as for the visible light reflectance by measuring diffuse reflected light including reflections other than positive reflections as received by an integrating sphere, in the method for measuring spectral reflectance as described in JIS R3106: 1998.

For example, by using privacy glass as the glass plate 11 and using a clear interlayer film as the first interlayer film 131, the visible light diffuse reflectance of the second component (assembly) of the glass plate 11 and the first interlayer film 131, can be made to be at most 6%. Further, by using clear glass or green glass as the glass plate 11 and using a colored interlayer film as the first interlayer film 131, the visible light diffuse reflectance of the second component (assembly) of the glass plate 11 and the first interlayer film 131 can be made to be at most 5%. Further, also by using privacy glass as the glass plate 11 and using a colored interlayer film as the first interlayer film 131, the visible light diffuse reflectance of the second component (assembly) of the glass plate 11 and first interlayer film 131 can be made to be at most 5%.

Here, green glass is a glass with high transparency. The visible light transmittance of green glass is, for example, from about 83% to 88% when the plate thickness is from 1.6 mm to 2.0 mm. Further, clear glass is a glass with even higher transparency than green glass, and its visible light transmittance is, for example, from about 88% to 92% when the plate thickness is from 1.8 mm to 2.0 mm.

The clear interlayer film is an interlayer film with high transparency. The visible light transmittance of the clear interlayer film is, for example, from about 90% to 95% when the film thickness is 0.76 mm. For example, a product with a visible light transmittance of 93.7% at a film thickness of 0.76 mm is commercially available from SEKISUI CHEMICAL CO., LTD. or EASTMAN.

Privacy glass is a glass with less transparency than green glass and clear glass and is also referred to as dark gray colored glass. Privacy glass can be realized by adjusting the total iron content as calculated as $Fe_2O_3$ in the glass plates 11 and/or 12. The visible light transmittance of privacy glass can be adjusted, for example, to be from about 40% to 50% in the case of a plate thickness of 1.8 mm or from about 30% to 45% in the case of plate thickness of 2.0 mm.

An example of the composition of privacy glass includes, as the glass matrix composition expressed as mass % based on oxides, $SiO_2$: from 66% to 75%, $Na_2O$: from 10% to 20%, CaO: from 5% to 15%, MgO: from 0% to 6%, $Al_2O_3$: from 0% to 5%, $K_2O$: from 0% to 5%, FeO: from 0.13% to 0.9%, total iron expressed by $Fe_2O_3$: from 0.8% to 2.4%, and $TiO_2$: more than 1% and at most 5%, and includes, to the total amount of the components of the glass matrix composition, CoO: 100 mass ppm to 500 mass ppm, Se: from 0 mass ppm to 70 mass ppm, and $Cr_2O_3$: from 0 mass ppm to 800 mass ppm, and the total amount of CoO, Se and $Cr_2O_3$ is less than 0.1 mass %.

Further, privacy glass is described in detail, for example, in WO 2015/088026, the contents of which are hereby incorporated by reference.

A colored interlayer film is an interlayer film with lower transparency than a clear interlayer film. The colored interlayer film can be prepared by coloring the material exemplified in the description in the section entitled [Interlayer film]. Specifically, the colored interlayer film can be obtained by adding a coloring agent to a composition containing mainly a thermoplastic resin. The colored interlayer film may also contain a plasticizer to adjust the glass transition point.

The coloring agent is not restricted so long as it is one to reduce the visible light transmittance, and includes a dye, an inorganic pigment, an organic pigment, etc. Among these, an inorganic or organic pigment is preferred, because there is little risk of fading due to long-term use, and an inorganic pigment is preferred because of its superior light resistance.

The organic pigment includes a black pigment such as aniline black, a red pigment such as alizarin rake, etc. The inorganic pigment includes a carbon pigment, a metal oxide pigment, etc. For example, black pigments such as carbon black, ivory black, Mars black, peach black, lamp black and magnetite-type tri-iron tetroxide, brown pigments such as amber, Burton amber, yellow walker, Van Dyke brown, sienna and Burton sienna, red pigments such as bengalla, molybdenum red and cadmium red, orange pigments such as red lead akaguchi and chrome vermilion, blue pigments such as turquoise, dark blue, cobalt blue and cerulean blue, green pigments such as chromium oxide, pyridian, emerald green and cobalt green, yellow pigments such as yellow lead, cadmium yellow, yellow iron oxide and titanium yellow, and purple pigments such as manganese violet and mineral violet, may be mentioned. Of these coloring agents, one type may be used alone, or two or more types may be used in combination.

The colored interlayer film may further contain one type or two or more types of various additives such as infrared absorbers, ultraviolet absorbers, fluorescent agents, adhesion modifiers, coupling agents, surfactants, antioxidants, heat stabilizers, light stabilizers, dehydrating agents, defoaming agents, antistatic agents and flame retardants.

The colored interlayer film can be prepared by a method of forming a printing layer in a dark color on the surface of an uncolored first interlayer film 131 and/or second interlayer film 132. As the method for forming the dark-colored printing layer, an usual method of printing by using a colored material on a resin substrate can be applied. The colored material includes organic and inorganic pigments similar to the above coloring agents. Here, since the printing layer in this case does not need to be durable at temperatures near the softening point of glass like the shielding layer made of ceramics, for example, an organic pigment including carbon black may be used. The thickness of the printing layer may be adjusted as needed to a thickness where the visible light transmittance of the first interlayer film 131 becomes to be at most the desired value.

By using a colored interlayer film, the visible light transmittance of the first interlayer film 131 and/or the second interlayer film 132, can be significantly reduced. For example, the visible light transmittance of the first interlayer film 131 and/or the second interlayer film 132 can be made to be at most 20%, at most 10% or at most 5%. For example, a product with a film thickness of 0.76 mm and a visible light transmittance of 1.33% and a product with a film thickness of 0.76 mm and a visible light transmittance of 8.96% are commercially available from SEKISUI CHEMICAL CO., LTD. and EASTMAN. Further, a product with a film thickness of 0.76 mm and a visible light transmittance of 18.00% is commercially available from SEKISUI CHEMICAL CO., LTD.

Further, when the compositions of the glass plates 11 and 12 are different, the bending conditions of the two are also different, and therefore, when the glass plates 11 and 12 are curved, it is difficult to bend the glass plates 11 and 12 to a shape precision to such an extent that the vehicle window glass 1 can be easily prepared. Therefore, for the purpose for production, it is preferred that the composition of the glass plate 11 and the glass plate 12 be the same. However, it is also possible to have a combination of different compositions of the glass plate 11 and glass plate 12, for example, by using green glass or clear glass for the glass plate 11 and privacy glass for the glass plate 12.

Further, in the vehicle window glass 1, in order to prevent the red color displayed by the display 20 from leaking out of the vehicle, the absorption coefficient of the first component (glass plate 12 and second interlayer film 132) at a wavelength of 700 nm is preferably at least 30%, more preferably at least 50%, further preferably at least 65%. By setting like this, the glass plate 12 and the second interlayer film 132 absorb the red color caused by the back reflection of the display 20, thereby reducing the risk of the red color displayed by the display 20 leaking outside the vehicle and being mistaken for the red color of the brake lamp, etc.

Further, from the viewpoint of ensuring the visibility of the display 20 while preventing the red color displayed by the display 20 from leaking outside the vehicle, the absorption coefficient at a wavelength of 700 nm of the second component (glass plate 11 and first interlayer film 131) is preferably smaller than the absorption coefficient at a wavelength of 700 nm of the first component (glass plate 12 and second interlayer film 132).

Further, in order to suppress the blurring of light around the display 20 in the vehicle window glass 1, the visible light diffuse transmittance/visible light transmittance of the components (e.g. the framed interlayer film, etc.) in the area within 20 mm around the display 20 is preferably at most 2.5%. Further, it is also preferred that the area within 20 mm around the display 20 is shielded by a shielding layer.

Variation 1 of the First Embodiment

Variation 1 of the first embodiment shows an example of attaching the display 20 to the inside surface of a glass member. In Variation 1 of the first embodiment, explanations of the same constituent parts as those of the embodiments already described may sometimes be omitted.

Figure 4:
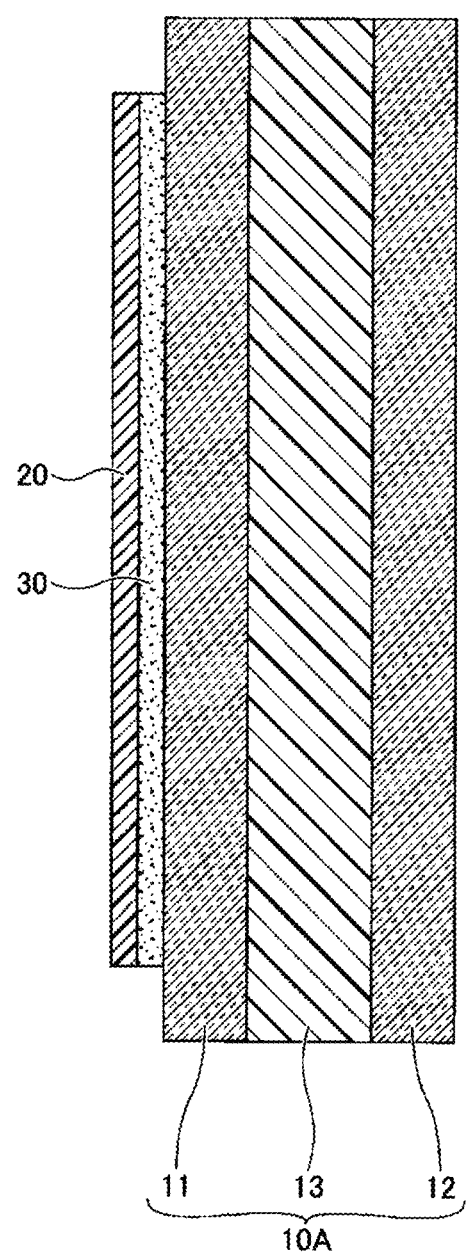
FIG. 4 is a cross-sectional view illustrating a vehicle window glass according to Variation 1 of the first embodiment.

FIG. 4 is a cross-sectional view illustrating a vehicle window glass 1A according to Variation 1 of the first embodiment. Referring to FIG. 4, the vehicle window glass 1A has a glass member 10A, a display 20 and an adhesive layer 30. The glass member 10A is a laminated glass having a glass plate 11, a glass plate 12, and an interlayer film 13. The display 20 is attached to the vehicle interior side surface of the glass plate 11 constituting the glass member 10A, via the adhesive layer 30.

The material for the adhesive layer 30 may, for example, be a material of acrylic type, acrylate type, urethane type, urethane acrylate type, epoxy type, epoxy acrylate type, polyolefin type, modified olefin type, polypropylene type, ethylene vinyl alcohol type, vinyl chloride type, chloroprene rubber type, cyanoacrylate type, silicone type, polyamide type, polyimide type, polystyrene type or polyvinyl butyral type. The thickness of the adhesive layer 30 is, for example, at least 0.2 µm and at most 2,000 µm.

Also in the vehicle window glass 1A, as in the vehicle window glass 1, the relationship between the visible light transmittance T of the portion including the display 20 and the luminance L of the display 20 is required to be within the range below the line (1) in FIG. 3. In other words, the relationship between the visible light transmittance T of the portion including the display 20 and the luminance L of the display is required to be $T \leq 0.1 \times L$. To further improve the visibility, as in the case of vehicle window glass 1, $T \leq 0.01 \times L$ (the range below the line (2) in FIG. 3) is preferred, and $T \leq 0.002 \times L$ (the range below the line (3) in FIG. 3) is more preferred.

To lower the visible light transmittance T of the portion including the display 20, as in the vehicle window glass 1, the visible light transmittance of the glass plate 11 may be lowered, the visible light transmittance of the glass plate 12 may be lowered, the visible light transmittance of the interlayer film 13 may be lowered, or a combination of two or more of these may be used.

Second Embodiment

The second embodiment of the present invention shows an example of attaching the display 20 to the interior side of a single plate of glass instead of laminated glass. In the second embodiment, explanations of the same component parts as those of the embodiments already described may sometimes be omitted.

Figure 5:
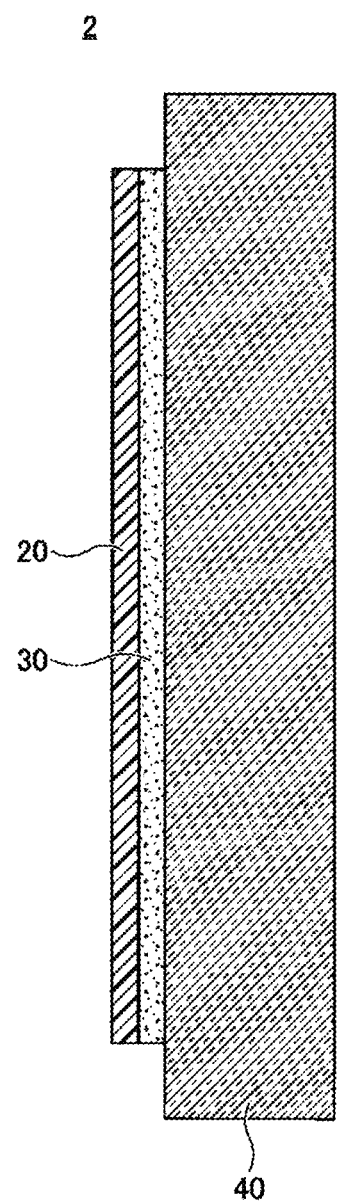
FIG. 5 is a cross-sectional view illustrating a vehicle window glass according to the second embodiment of the present invention.

FIG. 5 is a cross-sectional view illustrating a vehicle window glass 2 according to the second embodiment. Referring to FIG. 5, the vehicle window glass 2 has a glass member 40, a display 20 and an adhesive layer 30. The display 20 is attached to the interior side of the glass member 40 via the adhesive layer 30. The glass member 40 is a single plate of glass. As the glass member 40, it is preferred to use the aforementioned physically or chemically tempered glass. The thickness of the glass member 40 is, for example, at least 2 mm and at most 10 mm.

Also in the vehicle window glass 2, as in the vehicle window glass 1, the relationship between the visible light transmittance T of the portion including the display 20 and the luminance L of the display 20 is required to be within the range below the line (1) in FIG. 3. In other words, the relationship between the visible light transmittance T of the portion including the display 20 and the luminance L of the display is required to be $T \leq 0.1 \times L$. Further, to further improve the visibility, as in the case of vehicle window glass 1, $T \leq 0.01 \times L$ (the range below the line (2) in FIG. 3) is preferred, and $T \leq 0.002 \times L$ (the range below the line (3) in FIG. 3) is more preferred.

To lower the visible light transmittance T of the portion including the display 20, the visible light transmittance of the glass member 40 may be lowered. Specifically, privacy glass may be used as the glass member 40.

Third Embodiment

The third embodiment of the present invention shows an example of attaching the display 20 to the inner surface of multi-layered glass instead of laminated glass. In the third embodiment, explanations of the same component parts as those of the embodiments already described may sometimes be omitted.

Figure 6:
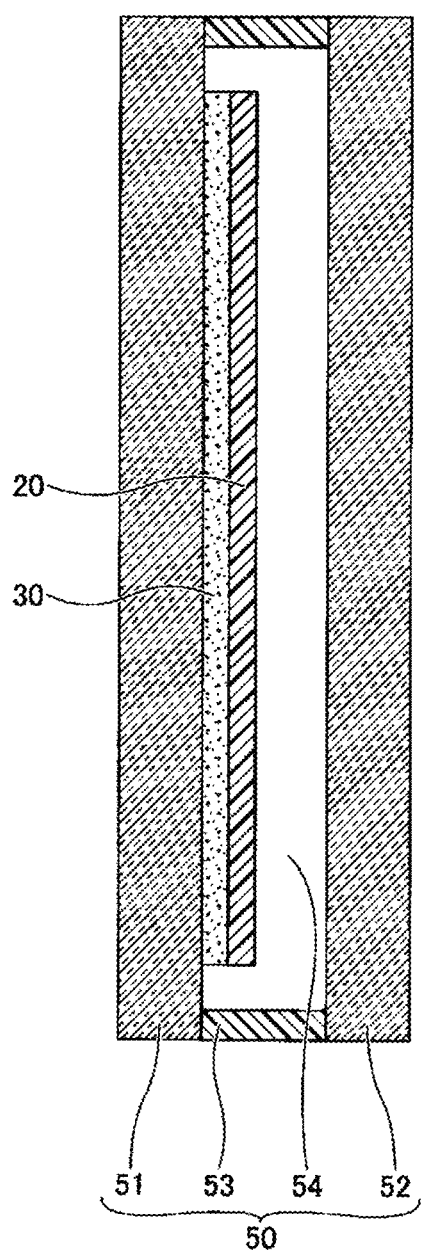
FIG. 6 is a cross-sectional view illustrating a vehicle window glass according to the third embodiment of the present invention.

FIG. 6 is a cross-sectional view illustrating a vehicle window glass 3 according to the third embodiment. Referring to FIG. 3, the vehicle window glass 3 has a glass member 50, a display 20, and an adhesive layer 3. The glass member 50 is a multi-layered glass having a glass plate 51, a glass plate 52, a spacer 53 and a hollow layer 54.

The glass plate 51 is a vehicle interior side glass plate that will be on the inside of the vehicle when the vehicle window glass 3 is mounted on the vehicle. Further, the glass plate 52 is the vehicle exterior side glass plate that will be on the exterior side of the vehicle when the window glass 3 is mounted on the vehicle. The glass plate 51 and the glass plate 52 are positioned opposite each other at a predetermined distance by the spacer 53, and a hollow layer 54 is formed between the glass plate 51 and the glass plate 52. Between the spacer 53 and the glass plate 51, and between the spacer 53 and the glass plate 52, for example, an adhesive layer is formed. The display 20 is, via the adhesive layer 30, attached to the surface of the hollow layer 54 side of the glass plate 51, which constitutes the glass member 50.

As the glass plates 51 and 52, for example, ones exemplified as the glass plates 11 and 12 in the first embodiment may be used. The vehicle window glass 3 is preferably a window glass that takes into consideration the protection of occupants and pedestrians, so called safety glass. When the glass plates 51 and 52 are single plates, both glass plates 51 and 52 are preferably tempered glass. However, the glass plates 51 and/or 52 are not limited to single plates, but may also be laminated glass. When the glass plates 51 and/or 52 are laminated glass, the display 20 may be sealed in the laminated glass. In a case where only one of the glass plates 51 and 52 is laminated glass, the other glass plate is preferably tempered glass.

The spacer 53 may be formed, for example, from a resin material containing a moisture absorbent. As the resin material, for example, a thermoplastic resin material including butyl rubber may be mentioned. As the moisture absorbent, for example, zeolite, silica gel or the like may be mentioned. The hollow layer 54 may, for example, be vacuum or may contain air or a rare gas such as argon. Further, in the hollow layer 54, at a portion that does not overlap with the display 20, pillars to maintain the spacing between the glass plates 51 and 52, may be provided.

Also in the vehicle window glass 3, as in the vehicle window glass 1, the relationship between the visible light transmittance T of the portion including the display 20 and the luminance L of the display 20 is required to be within the range below the line (1) in FIG. 3. In other words, the relationship between the visible light transmittance T of the portion including the display 20 and the luminance L of the display is required to be $T \leq 0.1 \times L$. Further, to further improve the visibility, as in the case of the vehicle window glass 1, $T \leq 0.01 \times L$ (the range below the line (2) in FIG. 3) is preferred, and $T \leq 0.002 \times L$ (the range below the line (3) in FIG. 3) is more preferred.

To lower the visible light transmittance T of the portion including the display 20, the visible light transmittance of the glass plate 51 and/or the glass plate 52 may be lowered. Specifically, in a case where the glass plate 51 and/or the glass plate 52 is a single plate of glass, privacy glass may be used for one or both of them. In a case where the glass plate 51 and/or the glass plate 52 is laminated glass, the same combination as that illustrated in the first embodiment may be used.

From the viewpoint of darkening the outside light and reducing the background luminance, it is preferred to reduce the visible light transmittance of the first component (glass plate 52). Specifically, the visible light transmittance of the glass plate 52 is preferably at most 50%, more preferably at most 30%, further preferably at most 20%. On the other hand, from the viewpoint of keeping the display 20 bright, or in other words, not preventing the transmission of light rays emitted from the display 20, it is preferred to increase the visible light transmittance of the second component (glass plate 51). Specifically, the visible light transmittance of the glass plate 51 is preferably at least 15%, more preferably at least 40%.

Further, from the viewpoint of making the display 20 inconspicuous from inside of the vehicle when the display 20 is off, it is preferred to reduce the visible light transmittance of the second component (glass plate 51). The visible light transmittance of the glass plate 51 is preferably at most 90%, more preferably at most 50%.

Further, the preferred visible light diffuse transmittance/visible light transmittance and visible light reflectance are also the same as for the vehicle window glass 1.

EXAMPLES

In the following, Examples will be described, but the present invention is not limited in any way to these Examples.

Ex. 1

In Ex. 1, laminated glass LG1 for evaluation with the same structure as of vehicle window glass 1 was prepared. Specifically, first, a glass plate 11 which becomes the inner plate (vehicle interior glass plate) when made into laminated glass, a glass plate 12 which becomes the outer plate (vehicle exterior glass plate) when made into laminated glass, a first interlayer film 131, and the second interlayer film 132 were prepared to meet the layer composition of Ex. 1 in FIG. 7. The dimensions of the glass plates 11 and 12 are shown in FIG. 7. The dimensions of the glass plates 11 and 12 were 300 mm×300 mm×2 mm in thickness. Further, the dimensions of the first interlayer film 131 and the second interlayer film 132 were 300 mm×300 mm×0.76 mm in thickness. Further, a transparent screen film (visible light transmittance 95%) was prepared as the display 20.

Here, in the columns for glass plates 11 and 12 in FIG. 7, Clear G indicates clear glass, Green G indicates green glass, and Privacy G indicates privacy glass. Further, in the columns for first interlayer film 131 and second interlayer film 132 in FIG. 7, Clear PVB indicates a clear interlayer film made of PVB, and Colored PVB indicates a colored interlayer film made of PVB. The same applies also in FIGS. 8 and 9. Further, in the columns for first interlayer film 131 and second interlayer film 132 in FIG. 9, Clear EVA indicates a clear interlayer film made of EVA.

Next, the first interlayer film 131, the transparent screen film and the second interlayer film 132 were sandwiched between the glass plate 11 and the glass plate 12, to prepare a laminate, and the laminate was placed in a rubber bag and bonded at a temperature of from about 70° C. to 110° C. in vacuum at a gauge pressure of from −65 kPa to −100 kPa. And, the laminate was then pressed and heated under conditions of an absolute pressure of from 0.6 MPa to 1.3 MPa and a temperature of from about 100° C. to 150° C., to prepare laminated glass LG1 for evaluation.

Next, depending on the second component (glass plate 11 and first interlayer film 131) located on the vehicle interior side of the laminated glass LG1 for evaluation, the projection device was adjusted so that the luminance of the transparent screen film became 800 cd/m². And, with respect to each of three cases where the background luminance was 100 cd/m², 1,000 cd/m² and 5,000 cd/m², a Landolt ring with a predetermined gap was projected from the projection device onto the transparent screen film of the laminated glass LG1 for evaluation. The projection by the projection device was made from the glass plate 11 side of the laminated glass LG1 for evaluation. Here, the luminance (800 cd/m²) of the transparent screen film was a value measured for the entire vehicle window glass. Further, the background luminance was a value measured without the vehicle window glass.

Next, as an evaluation of visibility, with respect to each of three cases where the background luminance was 100 cd/m², 1,000 cd/m² and 5,000 cd/m², whether or not the gap between the Landolt ring was visible from 1 m away on the glass plate 11 side of the laminated glass for evaluation, was judged. The judgment was made by a test operator with a visual acuity of at least 1.5. The judgment standards were as follows.

A case where the Landolt ring (predetermined gap=0.29 mm) corresponding to a visual acuity of 1.0, was not visible, was judged to be a failure (poor). Further, a case where the Landolt ring (predetermined gap=0.29 mm) corresponding to a visual acuity of 1.0 was visible, but the Landolt ring (predetermined gap=0.24 mm) corresponding to a visual acuity of 1.2, was not visible, was judged to have passed at an acceptable (fair) level.

Further, a case where the Landolt ring (predetermined gap=0.24 mm) corresponding to a visual acuity of 1.2 was visible and the Landolt ring (predetermined gap=0.19 mm) corresponding to a visual acuity of 1.5 was not visible, was judged to have passed at a good level. Further, a case where the Landolt ring (predetermined gap=0.19 mm) corresponding to a visual acuity of 1.5 was visible, was judged to have passed as an excellent level.

Further, the overall judgment was made to be acceptable if the background luminance was at least 100 cd/m², to be good if the background luminance was at least 1,000 cd/m², and to be excellent if the background luminance was at least 5,000 cd/m².

Further, with respect to the laminated glass LG1 for evaluation, the visible light transmittance T (%) of the entire laminated glass LG1 for evaluation was measured by the method in accordance with JIS R 3106:1998.

Ex. 2 to Ex. 4

Laminated glasses LG2 to LG4 for evaluation were prepared in the same manner as in Ex. 1, except that the glass plates 11 and 12 and the first interlayer film 131 and the second interlayer film 132 were prepared according to the layer configurations of Ex. 2 to Ex. 4 in FIG. 7. And, with respect to the laminated glasses LG2 to LG4 for evaluation, the measurements of the visible light transmittance T and the evaluations of the visibility were carried out in the same manner as in Ex. 1.

Results of the Evaluation of Ex. 1 to Ex. 4

In FIG. 7, with respect to each of the laminated glasses for evaluation, along with the layer composition of the glass plates 11 and 12, the first interlayer film 131 and the second interlayer film 132, the evaluation results (judgment) of visible light transmittance T and visibility, are summarized.

From FIG. 7, the visible light transmittance T of the laminated glass including the display in Ex. 1 was 90%. Since the luminance of the display was L=800 cd/m², the visible light transmittance T in Ex. 1 was greater than 0.1×800=80, and the overall judgment in this case was unacceptable (poor). On the other hand, in Ex. 2, the visible light transmittance T was 80%, and this value is equal to 0.1×800=80, and the overall judgment in this case was fair. Further, in Ex. 3, the visible light transmittance T was 8.0%, which is equal to 0.01×800=8.0, and the overall judgment in this case was good. Further, in Ex. 4, the visible light transmittance T was 1.6%, which is equal to 0.002×800=1.6, and the overall judgment in this case was excellent.

From these results, it has been found that at a background luminance of about evening (100 cd/m²), which is close to nighttime, by satisfying T≤0.1 L, the image on the display can be visible. Further, it has been found that if the background luminance is about the same as that in the early evening (1,000 cd/m²), by satisfying T≤0.01 L, the image on the display can be visible. Further, it has been found that by satisfying T≤0.002 L, the image on the display can be visible, not only in the case of the background luminance of about evening (100 cd/m²) close to nighttime and the background luminance of just after evening (1,000 cd/m²), but also in the case of the background luminance of about daytime (5,000 cd/m²).

Ex. 5 to Ex. 9

The glass plates 11 and 12 as well as the first interlayer film 131 and the second interlayer film 132 were prepared according to the layer configurations of Ex. 5 to Ex. 9 in FIG. 8. Further, an organic EL display (visible light transmittance 43%) was used as the display instead of a transparent screen film. And, with respect to each of three cases where the background luminance was 100 cd/m², 1,000 cd/m² and 5,000 cd/m², a Landolt ring with a predetermined gap was displayed on the organic EL display.

In the same manner as in Ex. 1 except for the above points, laminated glasses LG5 to LG9 for evaluation were prepared. And, with respect to the laminated glasses LG5 to LG9 for evaluation, measurements of the visible light transmittance T and evaluations of the visibility were carried out in the same manner as in Ex. 1. Further, at the time of evaluation of the visibility, the organic EL display was adjusted so that the luminance measured for the entire vehicle window glass became 400 cd/m².

Results of the Evaluation of Ex. 5 to Ex. 9

In FIG. 8, with respect to each of the laminated glasses for evaluation, along with the layer construction of the glass plates 11 and 12, the first interlayer film 131 and the second interlayer film 132, the results of evaluation (judgment) of the visible light transmittance T and the visibility were summarized.

From FIG. 8, in Ex. 5, the visible light transmittance T of the laminated glass including the display, was 45%. Since the luminance of the display is L=400 cd/m², the visible light transmittance T in Ex. 5 was greater than 0.1×400=40, and the overall judgment in this case was unacceptable. On the other hand, in Ex. 6, the visible light transmittance T was 40%, and this value is equal to 0.1×400=40, and the overall judgment in this case was fair. In Ex. 7, the visible light transmittance T was 4.0%, and this value is equal to 0.01×400=4.0, and the overall judgment in this case was good. In Ex. 8, the visible light transmittance T was 0.8%, and this value is equal to 0.002×400=0.8, and the overall judgment in this case was excellent. Further, in Ex. 9, the visible light transmittance T was 0.05%, and this value is smaller than 0.002×400=0.8, and the overall judgment in this case was excellent. However, in Ex. 9, although the image displayed on the display was excellent in terms of visibility from inside of the vehicle, the visible light transmittance T was small at a level of less than 0.1%, and the view outside the vehicle could not be visible from inside of the vehicle.

From these results, it has been found that at a background luminance of about evening (100 cd/m²), which is close to nighttime, by satisfying T≤0.1 L, the image on the display can be visible. Further, it has been found that in the case where the background luminance is about the same as that in the early evening (1,000 cd/m²), by satisfying T≤0.01 L, the image on the display can be visible. Further, it has been found that by satisfying T≤0.002 L, not only in the case of the background luminance of about evening (100 cd/m²) close to night and the background luminance of just after evening (1,000 cd/m²), but also in the case of the background luminance of about daytime (5,000 cd/m²), the image on the display can still be visible.

Thus, in the case where the display was an organic EL display, the same results as in the case of a transparent screen film, were obtained. In other words, these results do not depend on the type of the display.

Ex. 10 to Ex. 15

The glass plates 11 and 12 as well as the first interlayer film 131 and the second interlayer film 132 were prepared in accordance with the layer constructions of Ex. 10 to 15 in FIG. 9. Further, as the display, an organic EL display (visible light transmittance 43%) was used instead of a transparent screen film. And, with respect to each of three cases of the background luminance of 100 cd/m², 1,000 cd/m² and 5,000 cd/m², a Landolt ring with a predetermined gap was displayed on the organic EL display.

In the same manner as in Ex. 1 except for the above points, laminated glasses LG10 to LG15 for evaluation were prepared. And, with respect to the laminated glasses LG10 to LG15 for evaluation, the visible light transmittance T and the visible light diffuse transmittance/visible light transmittance of the first component located on the exterior side of the vehicle were measured. Further, as evaluation of the visibility, the visibility at the time when irregularities were caused in the background luminance, was evaluated by the same standards as in Ex. 1. Here, at the time of evaluating the visibility, the organic EL display was adjusted so that the luminance measured for the entire vehicle window glass became 500 cd/m².

Results of the Evaluation of Ex. 10 to Ex. 15

In FIG. 9, with respect to each of the laminated glasses for evaluation, along with the layer construction of the glass plates 11 and 12 as well as the first interlayer film 131 and the second interlayer film 132, the evaluation results (judgment) of the visible light diffuse transmittance/visible light transmittance and the visibility were summarized.

As shown in FIG. 9, the higher the visible light diffuse transmittance/visible light transmittance, the better visibility was obtained even when the background luminance irregularities were large. The background luminance irregularities in FIG. 9 are ones based on the assumption of background luminance irregularities that occur during driving. Therefore, if the visible light diffuse transmittance/visible light transmittance is high, it can be said that the background luminance irregularities that occur during driving can be mitigated. Specifically, the visible light diffuse transmittance/visible light transmittance is preferably at least 0.45%, and at a level of at least 0.81%, it was possible to sufficiently mitigate the background luminance irregularities and to obtain particularly good visibility.

In the foregoing, although the preferred embodiments, etc., have been described in detail, without being limited to the above-described embodiments, etc., various modifications and substitutions can be made to the above-described embodiments, etc., without departing from the scope of the claims.

For example, the visible light transmittance of the vehicle window glass may be controlled by a light controlling element. In such a case, for example, a light intensity sensor may be installed to acquire background luminance, and the visible light transmittance of the light controlling element may be changed based on the detection result of the light intensity sensor to control the visible light transmittance of the vehicle window glass. The light intensity sensor may be installed either inside or outside of the vehicle. The ratio of the visible light transmittance in a state where the visible light transmittance is the highest and a state where it is the lowest, is preferably at least 2. Further, the visible light transmittance of the vehicle window glass may be controlled by dividing the vehicle window glass into multiple areas in plan view and changing the transmittance of the light controlling element in each area.

Further, the projection device may be installed on the second side than the vehicle window glass as described in the first to third embodiments, and may be used as a vehicle window glass system. The projection device projects light onto the display 20 to make the image visible to an observer, for example, a projector. The projection device may be located on the interior side of the vehicle than the vehicle window glass, but is not included in the "second component located on the vehicle interior side of the display 20".

REFERENCE SYMBOLS

1, 1A, 2, 3: Vehicle window glass
10, 10A, 40, 50: Glass member
11, 12, 51, 52: Glass plate
13: Interlayer film
20: Display
30: Adhesive layer
53: Spacer
54: Hollow layer
131: First interlayer film
132: Second interlayer film

What is claimed is:

1. A vehicle window glass having a glass member and a display mounted on the glass member, wherein the visible light transmittance T [%] of the vehicle window glass at the portion including the display and the luminance L [cd/m²] of the display satisfy the formula T≤0.1×L,
wherein the glass member comprises a glass plate located on a vehicle exterior side of the glass member, a glass plate located on a vehicle interior side of the glass member, and an interlayer film which bonds the glass plate located on the vehicle exterior side and the glass plate located on the vehicle interior side, and wherein the display is encapsulated in the interlayer film.

2. The vehicle window glass according to claim 1, which satisfies the formula T≤0.01×L.

3. The vehicle window glass according to claim 1, which satisfies the formula T≤0.002×L.

4. The vehicle window glass according to claim 1, wherein the visible light transmittance T is at least 0.1 [%].

5. The vehicle window glass according to claim 1, wherein a component located on the vehicle exterior side of the display has a visible light transmittance of at most 50%.

6. The vehicle window glass according to claim 1, wherein a component located on the vehicle interior side of the display has a visible light transmittance of at least 15%.

7. The vehicle window glass according to claim 1, wherein a component located on the vehicle interior side of the display has a visible light transmittance of at most 90%.

8. The vehicle window glass according to claim 1, wherein a component located on the vehicle exterior side of the display has a visible light diffuse transmittance/visible light transmittance of at least 0.4%.

9. The vehicle window glass according to claim 1, wherein vehicle interior side of the display has a visible light transmittance larger than a visible light transmittance of a component located on the vehicle exterior side of the display.

10. The vehicle window glass according to claim 1, wherein a component located on the vehicle interior side of the display has a visible light diffuse transmittance/visible light transmittance smaller than a visible light diffuse transmittance/visible light transmittance of a component located on the vehicle exterior side of the display.

11. The vehicle window glass according to claim 1, wherein a component located on the vehicle exterior side of the display has a visible light reflectance of at most 6%.

12. The vehicle window glass according to claim 1, a component located on the vehicle exterior side of the display has a visible light diffuse reflectance of at most 6%.

13. The vehicle window glass according to claim 1, wherein a component located on the vehicle interior side of the display has a visible light diffuse reflectance of at most 6%.

14. The vehicle window glass according to claim 1, wherein the display is attached to a predetermined surface of the glass member via an adhesive layer.

15. The vehicle window glass according to claim 14, wherein the glass member is single plate glass, laminated glass or double glazing glass.

16. The vehicle window glass according to claim 1, wherein the display is a display with a display element.

17. The vehicle window glass according to claim 1, wherein the display is a transparent screen film.

18. The vehicle window glass according to claim 1, further comprising a light controlling film on the vehicle exterior side or the vehicle interior side of the display.

19. A vehicle window glass system comprising:
the vehicle window glass according to claim 17; and
a projection device located on the vehicle interior side of the vehicle window glass.

20. A vehicle window glass system comprising the vehicle window glass according to claim 18 and a light intensity sensor to acquire background luminance, wherein a visible light transmittance of a light controlling element in the light controlling film is controlled based on a background luminance acquired by the light intensity sensor.

* * * * *